United States Patent
Han et al.

(10) Patent No.: US 10,511,537 B2
(45) Date of Patent: Dec. 17, 2019

(54) SCHEDULING METHOD AND SCHEDULER FOR SWITCHING

(71) Applicant: ELECTRONICS AND TELECOMMUNICATIONS RESEARCH INSTITUTE, Daejeon (KR)

(72) Inventors: Kyeong-Eun Han, Daejeon (KR); Jongtae Song, Daejeon (KR); Daeub Kim, Daejeon (KR); Chansung Park, Sejong-si (KR); Sun Me Kim, Daejeon (KR); Ji Wook Youn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 260 days.

(21) Appl. No.: 15/607,931

(22) Filed: May 30, 2017

(65) Prior Publication Data

US 2018/0262437 A1    Sep. 13, 2018

(30) Foreign Application Priority Data

Oct. 3, 2017    (KR) ..................... 10-2017-0030744

(51) Int. Cl.
*G06F 9/48* (2006.01)
*H04L 12/00* (2006.01)
(Continued)

(52) U.S. Cl.
CPC .......... *H04L 47/6215* (2013.01); *G06F 9/48* (2013.01); *G06F 9/4806* (2013.01);
(Continued)

(58) Field of Classification Search
CPC ........ G06F 9/48; G06F 9/4806; G06F 9/4837; G06F 9/4843; G06F 9/4881;
(Continued)

(56) References Cited

U.S. PATENT DOCUMENTS 6,064,651 A * 5/2000 Rogers .................. H04L 49/104
                                                            370/232
9,286,127 B2 * 3/2016 Guan ..................... G06F 9/4881
(Continued)

FOREIGN PATENT DOCUMENTS

KR    10-2009-0062878 A    6/2009
KR    10-2010-0010849 A    2/2010

OTHER PUBLICATIONS

Liu et al, "Performance COmparison of DTDM and OBS Scheduling for Agile All-Photonic Network", in Proc. IFIP Metropolitan Area Network Conference, Ho Chi Minh City, Vietnam, p. 1-18 plus cover page (Year: 2005).*

(Continued)

*Primary Examiner* — Charles M Swift
(74) *Attorney, Agent, or Firm* — LRK Patent Law Firm

(57) ABSTRACT

A scheduling method for switching including receiving an allocation request for a time slot from input nodes to which the time slot is not allocated, receiving property information of at least one of virtual output queues (VOQs) in which data received by the input nodes is stored, determining a transmission priority of the VOQs for transmission of the data stored in the VOQs based on the received property information of the VOQs, determining input nodes to which the time slot is to be allocated using outputter arbiters for output nodes corresponding to the VOQs, allocating the time slot to the determined input nodes, and updating elements used to allocate the time slot with respect to input nodes for which
(Continued)

the allocating of the time slot is completed and output nodes for which the allocating of the time slot is completed.

19 Claims, 7 Drawing Sheets

(51) Int. Cl.
| | |
|---|---|
| *H04L 12/50* | (2006.01) |
| *H04L 12/54* | (2013.01) |
| *H04L 12/931* | (2013.01) |
| *H04L 12/947* | (2013.01) |
| *H04L 12/937* | (2013.01) |
| *H04L 12/863* | (2013.01) |
| *H04L 12/875* | (2013.01) |
| *H04L 12/701* | (2013.01) |

(52) U.S. Cl.
CPC .......... *G06F 9/4837* (2013.01); *G06F 9/4843* (2013.01); *G06F 9/4881* (2013.01); *G06F 9/4887* (2013.01); *H04L 12/00* (2013.01); *H04L 12/50* (2013.01); *H04L 12/54* (2013.01); *H04L 45/00* (2013.01); *H04L 47/562* (2013.01); *H04L 49/00* (2013.01); *H04L 49/252* (2013.01); *H04L 49/254* (2013.01)

(58) Field of Classification Search
CPC ....... G06F 9/4887; H04L 45/00; H04L 12/00; H04L 12/50; H04L 12/54; H04L 49/00; H04L 49/252; H04L 49/254
See application file for complete search history.

(56) References Cited

U.S. PATENT DOCUMENTS

| | | | | |
|---|---|---|---|---|
| 2002/0012344 | A1* | 1/2002 | Johnson | ............... H04L 49/254 370/389 |
| 2002/0154649 | A1* | 10/2002 | Takase | ................ H04L 49/3045 370/412 |
| 2004/0213251 | A1* | 10/2004 | Tran | .................... H04L 12/5601 370/395.1 |
| 2005/0152352 | A1* | 7/2005 | Jun | ........................ H04L 47/527 370/388 |
| 2007/0133585 | A1 | 6/2007 | Minkenberg et al. | |
| 2007/0253439 | A1* | 11/2007 | Iny | ......................... H04L 47/527 370/413 |
| 2008/0159149 | A1* | 7/2008 | Okuno | .................... H04L 47/11 370/237 |
| 2008/0175259 | A1* | 7/2008 | Chao | ................... H04L 47/6255 370/413 |
| 2008/0273545 | A1* | 11/2008 | Sgouros | .............. H04L 41/5022 370/412 |
| 2010/0272117 | A1* | 10/2010 | Wu | ........................ H04L 49/101 370/413 |
| 2011/0044174 | A1* | 2/2011 | Szymanski | ............. H04L 47/56 370/238 |
| 2015/0351118 | A1* | 12/2015 | Arnott | ................... H04W 16/14 370/252 |
| 2016/0180105 | A1* | 6/2016 | Jin | ........................ G06F 13/385 726/17 |
| 2018/0310078 | A1* | 10/2018 | Szymanski | ............. H04L 47/56 |

OTHER PUBLICATIONS

Ramamirtham et al, "Time Sliced Optical Burst Switching", IEEE, pp. 2030-2038 (Year: 2003).*

Liew et al, "On Slotted WDM Switching in Bufferless All-Optical Networks", Proceedings of the 11th Symposium on High Performance Interconnects (HOTI'03), IEEE, pp. 1-7, (Year: 2003).*

Xiao Liu et al., "A Comparison between Time-slot Scheduling Approaches for All-Photonic Networks", IEEE, 2005.

* cited by examiner

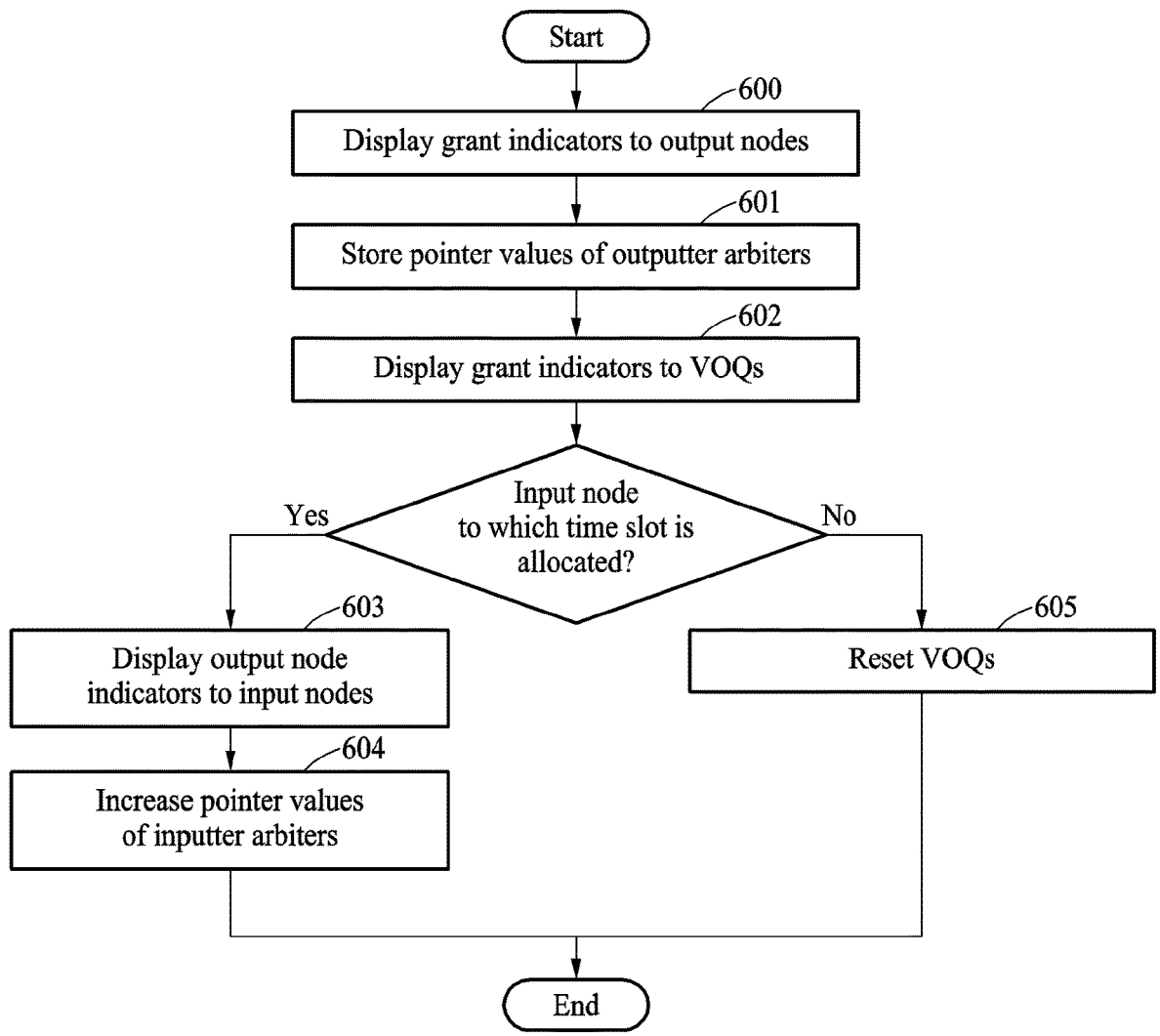

SCHEDULING METHOD AND SCHEDULER FOR SWITCHING

CROSS-REFERENCE TO RELATED APPLICATION(S)

This application claims the priority benefit of Korean Patent Application No. 10-2017-0030744, filed on Mar. 10, 2017, in the Korean Intellectual Property Office, the disclosure of which is incorporated herein by reference for all purposes.

BACKGROUND

1. Field

One or more example embodiments relate to a scheduling method and a scheduler to allocate a time slot for light switching or packet switching.

2. Description of Related Art

For data switching, based on at least one output from at least one input, scheduling for an input and an output of a switch may be essential in order to output data which is input to the switch from an input node to an output node without a collision occurring. Here, a scheduling algorithm may have a relatively high processing rate and a short delay, and equal transmissions may be performed with respect to each of virtual output queues (VOQs).

A scheduling algorithm according to the related art may allocate a time slot and may request allocating of a time slot using a round robin method or a random method. Although such method performs scheduling without considering information on a length of a VOQ or a delay of the VOQ, time slots are equally transmitted to VOQs. However, it is difficult to provide an optimal processing rate and a delay may occur during performance. Also, when scheduling is iteratively performed based on information on lengths of VOQs and delays of VOQs, a processing rate and a delay performance may be enhanced. However, implementation of hardware may be complex and a predetermined VOQ may be unable to gain a transmission opportunity.

Thus, a scheduling method providing an excellent processing rate and excellent delay performance by assigning an equal number of transmission opportunities to each of VOQs may be requested.

SUMMARY

An aspect provides a scheduling method and a scheduler that may determine a transmission priority of virtual output queues (VOQs) using a transmission priority table based on property information of the VOQs and allocate a time slot based on the transmission priority of the VOQs by performing scheduling using at least two arbiters.

According to an aspect, there is provided a scheduling method for switching including receiving an allocation request for a time slot from input nodes to which the time slot is not allocated, receiving property information of at least one of virtual output queues (VOQs) in which data received by the input nodes is stored, determining a transmission priority of the VOQs for transmission of the data stored in the VOQs based on the received property information of the VOQs, determining input nodes to which the time slot is to be allocated using outputter arbiters for output nodes corresponding to the VOQs, allocating the time slot to the determined input nodes, and updating elements used to allocate the time slot with respect to input nodes for which the allocating of the time slot is completed and output nodes for which the allocating of the time slot is completed.

The method may further include determining VOQs from which the stored data is to be transmitted using inputter arbiters corresponding to the determined transmission priority among inputter arbiters for the input nodes to which the time slot is not allocated.

The determining of the VOQs from which the stored data is to be transmitted may include identifying whether the transmission priority of the VOQs is a highest transmission priority, and performing round robin scheduling starting from pointer values indicated by the inputter arbiters corresponding to the transmission priority in response to the transmission priority being the highest transmission priority.

The performing of the round robin scheduling comprises performing the round robin scheduling starting from the pointer values indicated by the inputter arbiters corresponding to the transmission priority when the VOQs having a transmission priority higher than the transmission priority are absent, in response to the transmission priority not being the highest transmission priority.

The method may further include determining output nodes to receive the allocation request for the time slot based on a preset condition.

The property information may include lengths of the VOQs and delays of the VOQs.

A transmission priority table may indicate the transmission priority of the VOQs based on lengths of the VOQs and delays of the VOQs.

The determining of the input nodes to which the time slot is allocated may include identifying whether the transmission priority of the VOQs of the determined input nodes is a highest transmission priority, and performing round robin scheduling starting from pointer values indicated by outputter arbiters corresponding to the transmission priority in response to the transmission priority being a highest transmission priority.

The performing of the round robin scheduling may include performing the round robin scheduling starting from the pointer values indicated by the outputter arbiters corresponding to the transmission priority when the input nodes having a transmission priority higher than the transmission priority are absent, in response to the transmission priority being not the highest transmission priority.

The updating of the elements may include displaying grant indicators indicating allocating of the time slot is completed to the output nodes for which the allocating of the time slot is completed, storing pointer values of the outputter arbiters corresponding to the determined transmission priority of the VOQs, displaying the grant indicators to the VOQs corresponding to the output nodes to which the grant indicators are displayed among the VOQs for the input nodes to which the time slot is allocated, displaying an identification value for identifying the output nodes that allocate the time slot to the input nodes to which the time slot is allocated, and increasing the pointer values of the inputter arbiters corresponding to the determined transmission priority.

The method may further include resetting the VOQs corresponding to the output nodes to which the grant indicators are displayed among the VOQs of the input nodes to which the time slot is not allocated.

The method may further include initializing the elements used to allocate the time slot in response to allocating of the time slot to all input nodes being completed.

According to another aspect, there is provided a scheduling method for switching including receiving an allocation request for a time slot from input nodes to which the time slot is not allocated from input nodes connected to a switch, verifying whether the time slot to be allocated to the input nodes is a time slot for guaranteed bit rate (GBR) data based on a GBR table indicating information on the GBR data and the time slot for the GBR data, verifying whether virtual output queues (VOQs) storing the GBR data among at least one VOQ storing data received by the input nodes are present in response to the time slot being for the GBR data, and priorly allocating the time slot to the input nodes in response to the VOQs storing the GBR data being present.

According to still another aspect, there is provided a scheduler for switching, wherein the scheduler is configured to receive an allocation request for a time slot from input nodes to which the time slot is not allocated, receive property information of at least one of virtual output queues (VOQs) in which data received by the input nodes to which the time slot is not allocated is stored, determine a transmission priority of the VOQs for transmission of the data stored in the VOQs based on the received property information of the VOQs, determine input nodes to which the time slot is to be allocated using outputter arbiters corresponding to the transmission priority of the determined VOQs among outputter arbiters for output nodes corresponding to the VOQs, allocate the time slot to the determined input nodes, and update elements used to allocate the time slot with respect to input nodes for which allocating of the time slot is completed and output nodes for which allocating of the time slot is completed.

The scheduler may be configured to determine VOQs from which the stored data is to be transmitted using inputter arbiters corresponding to the determined transmission priority among inputter arbiters for the input nodes to which the time slot is not allocated.

The scheduler may be configured to determine the VOQs from which the stored data is to be transmitted, identify whether the transmission priority of the VOQs is a highest transmission priority, and perform round robin scheduling starting from pointer values indicated by the inputter arbiters corresponding to the transmission priority in response to the transmission priority being the highest transmission priority.

The scheduler may be configured to perform the round robin scheduling starting from the pointer values indicated by the inputter arbiters corresponding to the transmission priority when the VOQs having a transmission priority higher than the transmission priority are absent, in response to the transmission priority being not the highest transmission priority.

The scheduler may be configured to determine output nodes to receive the allocation request for the time slot based on a preset condition.

The scheduler may be configured to initialize the elements used to allocate the time slot in response to allocating of the time slot to all input nodes being completed.

The scheduler may be configured to receive an allocation request for a time slot from input nodes to which the time slot is not allocated among input nodes connected to a switch, verify whether the time slot to be allocated to the input nodes is a time slot for guaranteed bit rate (GBR) data based on a GBR table indicating information on the GBR data and the time slot for the GBR data, verify whether virtual output queues (VOQs) storing the GBR data among at least one VOQ storing data received by the input nodes are present in response to the time slot being for the GBR data, and priorly allocating the time slot to the input nodes in response to the VOQs storing the GBR data being present.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 is a flowchart illustrating a process of updating elements used to allocate a time slot according to an example embodiment;

FIG. 7 illustrates a guaranteed bit rate (GBR) table indicating information on GBR data according to an example embodiment.

DETAILED DESCRIPTION

Hereinafter, some example embodiments will be described in detail with reference to the accompanying drawings.

An inputter and an outputter in the present disclosure may be implemented as same modules or separate modules based on an implementation method, and functions of the inputter and the outputter may be separated in a form suitable for a distribution scheduler and a centralized scheduler based on an implementation method of the scheduler.

Figure 1:
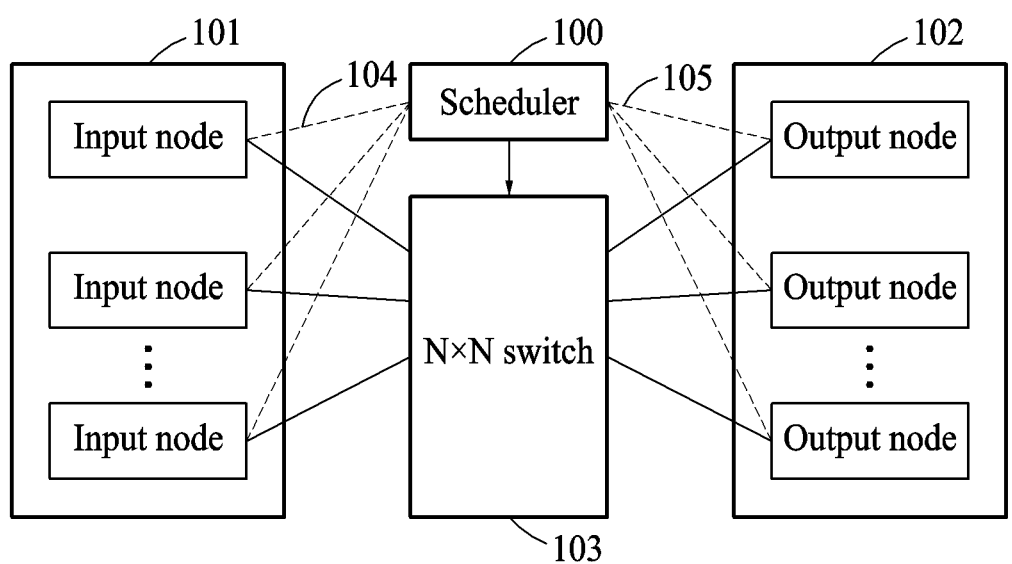
FIG. 1 illustrates apparatuses for switching according to an example embodiment.

FIG. 1 illustrates apparatuses for switching according to an example embodiment.

When data received by input nodes 101 is transmitted to output nodes 102 through an N×N switch 103, one of the output nodes 102 may receive the data from at least one of the input nodes 101. Here, a collision may occur between the input nodes 101 that are to transmit the data to the same output nodes 102. Here, a scheduler 100 may increase a processing rate of data transmission and reduce a delay time by allocating a time slot to the input nodes 101 that are to transmit the data to the identical output nodes 102. Here, each of the input nodes 101 and each of the output nodes 102 may be connected to the N×N switch 103 through links 104, and the input nodes 101 and the output nodes 102 may communicate with the scheduler 100 through channels 105.

Figure 2:
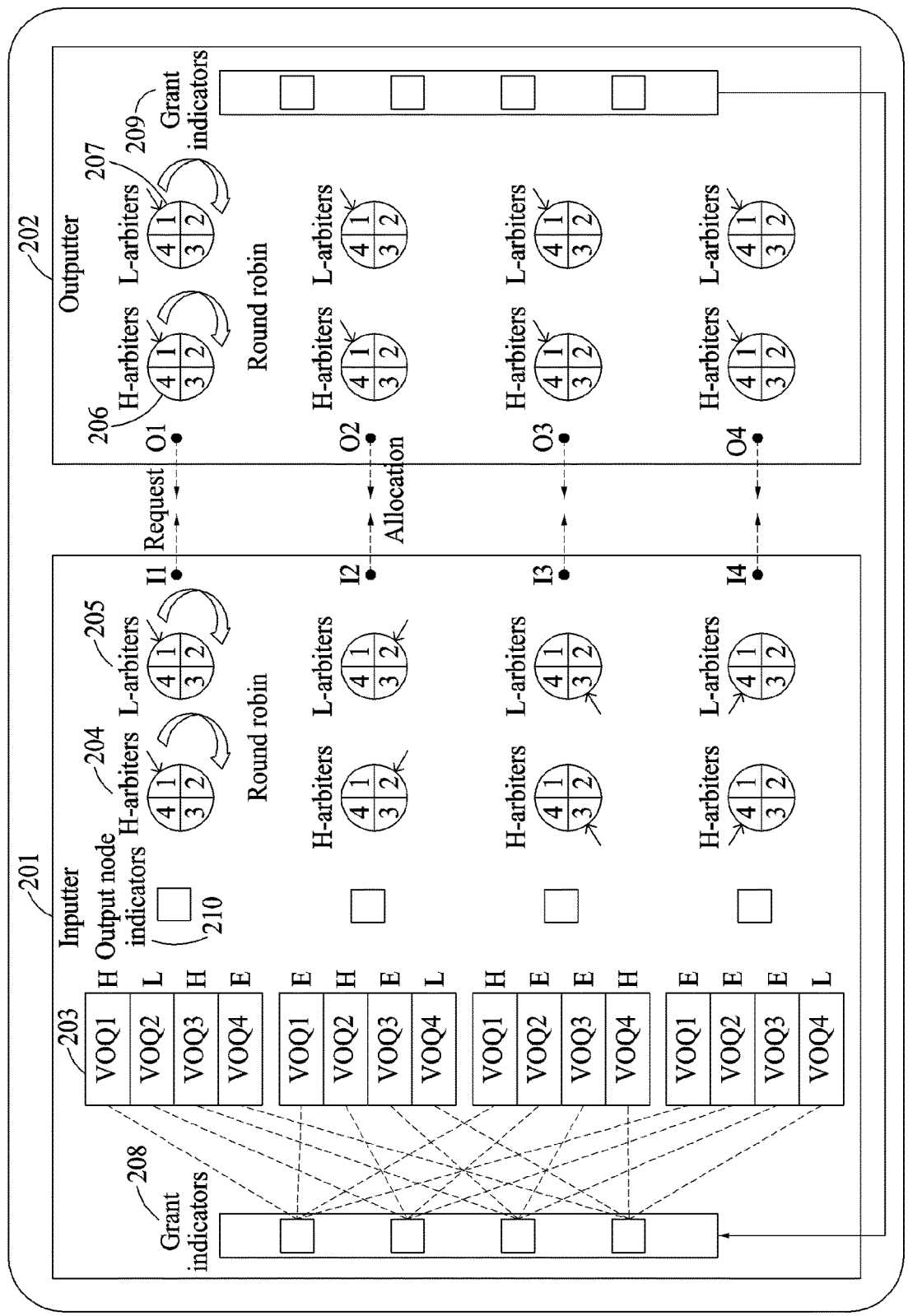
FIG. 2 illustrates a scheduling method according to an example embodiment.

FIG. 2 illustrates a scheduling method according to an example embodiment.

The scheduler 100 includes, in an inputter 201, information on virtual output queues (VOQs) 203 storing data information received by the input nodes 101 for each of output nodes 102 to which the data information is to be transmitted, inputter arbiters 204 and 205 used based on a transmission priority for data transmission based on the information on the VOQs 203, grant indicators 208 indicating allocating of a time slot is completed to the output nodes 102, and output node indicators 210 for identifying the output nodes 102 that allocate the time slot to the input nodes 101. Also, the scheduler 100 includes, in an outputter 202, outputter priority arbiters 206 and 207 for determining the time slot based on a priority of the input nodes 101 that are to transmit data to a predetermined output node, and grant indicators 209 indicating that the allocating of the time slot to the output nodes 102 is completed. Also, the scheduler 100 may identify whether to allocate the time slot based on guaranteed bit rate (GBR) data.

The VOQs 203 may have different transmission priorities based on a length of a queue and a delay of a queue. In an example, VOQs having a relatively high transmission priority among the VOQs 203 may have a transmission priority H (high), and VOQs having a relatively low transmission priority among the VOQs 203 may have a transmission priority L (low). In addition, VOQs not storing data to be transmitted may have a transmission priority E (empty).

The inputter arbiters 204 and 205 may correspond to the transmission priority of the VOQs 203. In more detail, H-inputter arbiters 204 may be present in response to the VOQs having the transmission priority H, and L-inputter arbiters 205 may be present in response to the VOQs having the transmission priority L. Inputter arbiters may determine VOQs from which the data is to be transmitted among the VOQs 203 by performing round robin scheduling starting from the H-inputter arbiters 204 corresponding to the VOQs having the transmission priority H.

The outputter arbiters 206 and 207 may correspond to the transmission priority of the VOQs 203 included in the input nodes 101 making an allocation request for the time slot to the output nodes 102. In more detail, H-outputter arbiters 206 may be present in response to the VOQs having the transmission priority H, and L-outputter arbiters 207 may be present in response to the VOQs having the transmission priority L. Outputter arbiters may determine input nodes to which the time slot is to be allocated among the input nodes 101 by performing round robin scheduling starting from the H-outputter arbiters 206 corresponding to the VOQs having the transmission priority H.

The output nodes 102 and the VOQs 203 storing the data information received by the input nodes 101 may have respective grant indicators 208 and 209. In addition, the input nodes 101 may have the output node indicators 210 for identifying output nodes that allocate the time slot to the input nodes 101 among the output nodes 102.

Figure 3:
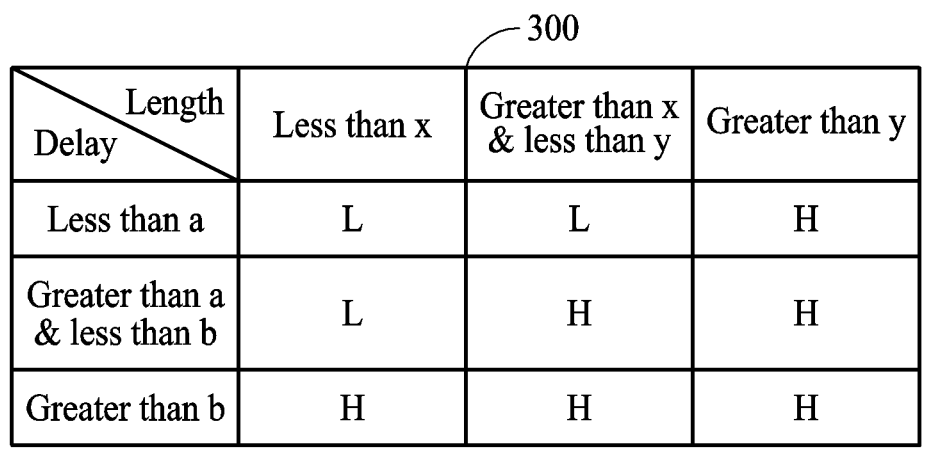
FIG. 3 illustrates a priority table indicating a transmission priority for data transmission of virtual output queues (VOQs) according to an example embodiment.

FIG. 3 illustrates a priority table indicating a transmission priority for data transmission of virtual output queues (VOQs) according to an example embodiment.

A priority table 300 may indicate a transmission priority for data transmission of the VOQs 203 based on lengths of the VOQs 203 and delays of the VOQs 203. In an example, the delays of the VOQs may be classified based on predetermined thresholds a and b. In more detail, the delays of the VOQs may be classified into a delay less than the predetermined threshold a, a delay greater than the predetermined threshold a and less than the predetermined threshold b, and a delay greater than the predetermined threshold b. The lengths of the VOQs 203 may be classified based on predetermined thresholds x and y. In more detail, the lengths of the VOQs 203 may be classified into a length less than the predetermined threshold x, a length greater than the predetermined threshold x and less than the predetermined threshold y, and a length greater than the predetermined threshold y. Here, numbers and thresholds of ranges of the lengths of the VOQs 203 and the delays of the VOQs 203 may be changeable.

The transmission priority for the data transmission of the VOQs 203 may be determined based on the classified delays of the VOQs 203 and the classified lengths of the VOQs 203. In an example, a VOQ of which a delay is less than the predetermined threshold a and a length is less than the predetermined threshold x has a transmission priority L, and a VOQ of which a delay is greater than the predetermined threshold b and a length is greater than the predetermined threshold y has a transmission priority H.

Figure 4:
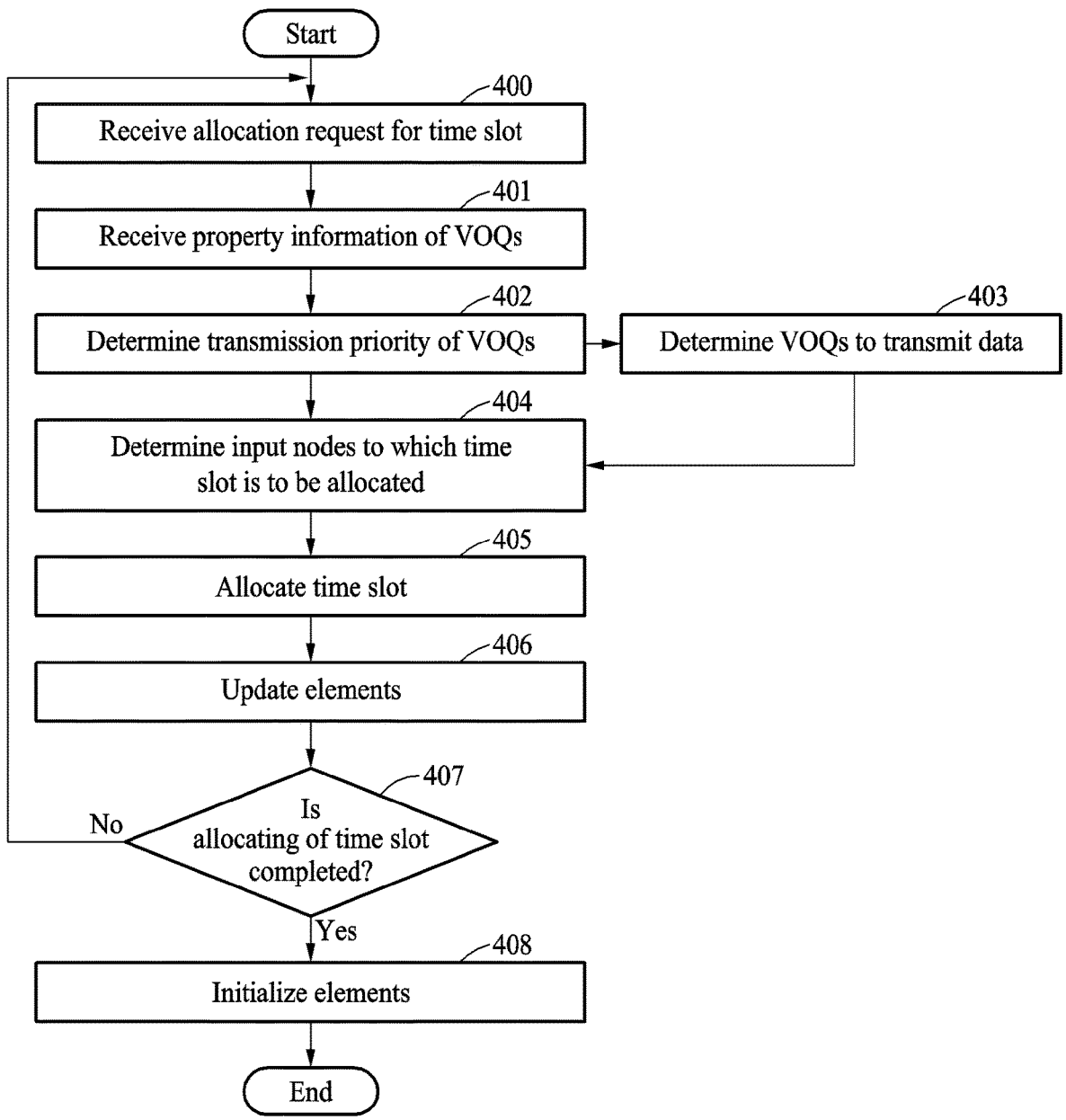
FIG. 4 is a flowchart illustrating a process of allocating a time slot according to an example embodiment.

FIG. 4 is a flowchart illustrating a process of allocating a time slot according to an example embodiment.

In operation 400, the scheduler 100 receives an allocation request for a time slot from remaining input nodes excluding input nodes with respect to VOQs having the grant indicators 208. In addition, the grant indicators 208 may be indicators indicating that allocating of the time slot is completed. That is, in operation 400, the scheduler 100 receives the allocation request for the time slot from input nodes to which the time slot is not allocated.

Here, the allocation request for the time slot from the input nodes may be associated with all output nodes or predetermined output nodes corresponding to a preset reference.

In operation 401, the scheduler 100 receives property information of VOQs storing data received by the input nodes making the allocation request for the time slot. Here, the property information of the VOQs may be information on delays of the VOQs and lengths of the VOQs.

In operation 402, the scheduler 100 determines a transmission priority of the VOQs for transmission of the data stored in the VOQs based on the received property information of the VOQs. Here, the property information of the VOQs may include a delay of a queue and a length of a queue. In more detail, the transmission priority of the VOQs of the input nodes making the allocation request for the time slot may be determined based on the priority table 300 indicating the transmission priority depending on the delays of the VOQs 203 and the lengths of the VOQs 203.

In operation 403, the scheduler 100 determines VOQs from which the data is to be transmitted among the VOQs of which the transmission priority is determined. In more detail, the scheduler 100 may identify the transmission priority of the VOQs, and determine the VOQs from which the data is to be transmitted using the inputter arbiters 204 or 205 corresponding to the identified transmission priority. Here, the scheduler 100 may not perform operation 403.

In operation 404, the scheduler 100 determines input nodes to which the time slot is to be allocated among the input nodes. In more detail, the scheduler 100 may identify the transmission priority of the determined VOQs from which the data is to be transmitted among the VOQs included in the input nodes, and determine the input nodes to which the time slot is to be allocated using the outputter arbiters 206 or 207 corresponding to the identified transmission priority.

In response to the scheduler 100 not performing operation 403, in operation 404, the scheduler 100 identifies the transmission priority of all of the VOQs 203 of the input nodes, and determines the input nodes to which the time slot is to be allocated using the outputter arbiters 206 or 207 corresponding to the identified transmission priority.

Here, when one input node receives an authorization for the allocation request of the time slot from at least two output nodes, the scheduler 100 may determine the VOQs from which the data is to be transmitted using the inputter arbiters 204 and 205 with respect to VOQs of the input node. In addition, an accept indicating that the authorization for the allocating of the time slot is received may be transmitted to the output nodes corresponding to the determined VOQs.

In operation 405, the scheduler 100 allocates the time slot to the determined input nodes to which the time slot is to be allocated. Also, input nodes allocating pointers of the current outputter arbiters 206 or 207 may be subsequently updated with respect to the output nodes for which the allocating of the time slot is completed.

In operation 406, the scheduler 100 updates elements used to allocate the time slot in order to allocate a time slot next to the allocated time slot.

In operation 407, the scheduler 100 verifies whether the allocating of the time slot to all input nodes 101 is completed. In response to input nodes to which the time slot is not allocated being present, the scheduler 100 may repeatedly perform operations 400 through 406 for allocating the time slot to corresponding input nodes.

In operation 408, the scheduler 100 may initialize all elements used to allocate the time slot because the allocating of the time slot to all input nodes 101 is completed. Here, the elements used to allocate the time slot may include the transmission priority of the VOQs, the priority table 300, the grant indicators 208 and 209, the output node indicators 210, the pointers of the inputter arbiters 204 and 205, and the pointers of the outputter arbiters 206 and 207.

Figure 5:
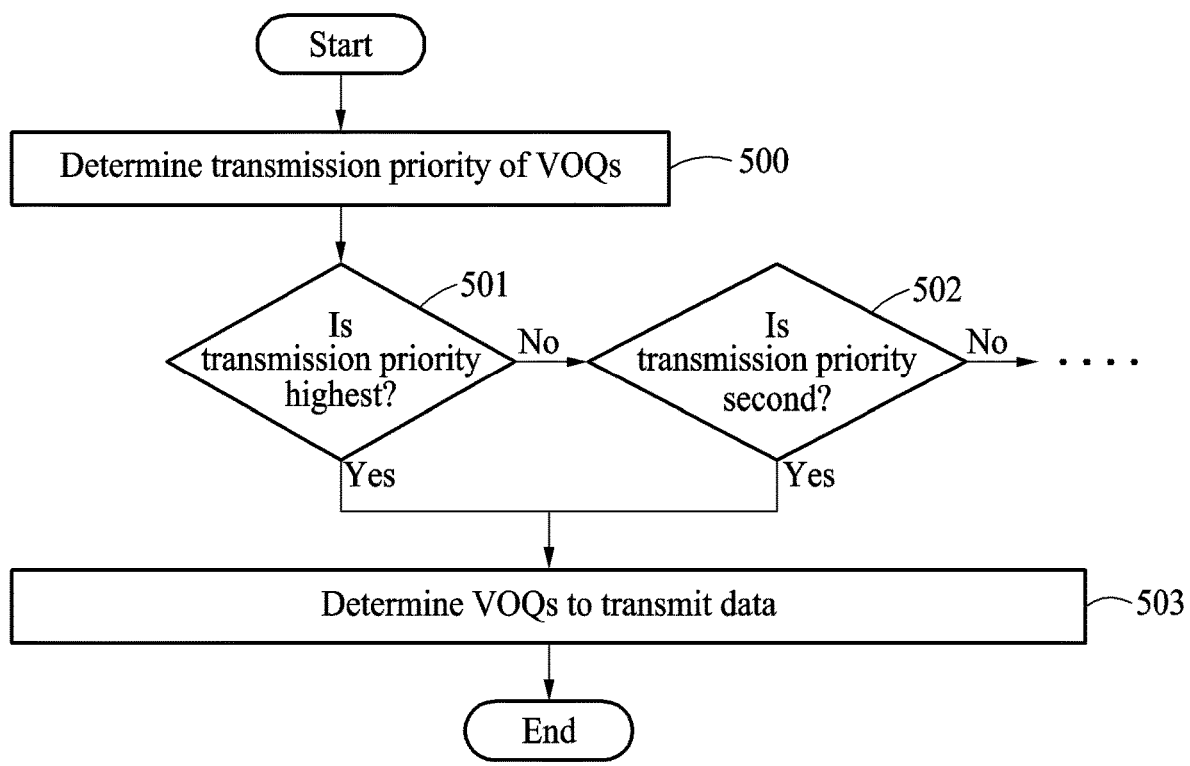
FIG. 5 is a flowchart illustrating a process of determining virtual output queues (VOQs) from which data is to be transmitted according to an example embodiment.

FIG. 5 is a flowchart illustrating a process of determining virtual output queues (VOQs) from which data is to be transmitted according to an example embodiment.

In operation 500, the scheduler 100 determines a transmission priority of VOQs for input nodes making an allocation request for a time slot based on property information of the VOQs and the priority table 300 indicating the transmission priority for data transmission of the VOQs 203. In an example, VOQs having a highest priority has a transmission priority H, and VOQs having a lowest priority has a transmission priority L. In addition, a transmission priority of VOQs not storing data to be transmitted may be determined to be a transmission priority E. Here, a time slot may not be allocated to the VOQs having the transmission priority E.

In operation 501, the scheduler 100 verifies whether the VOQs having the highest transmission priority among the VOQs 203 of which the transmission priority is determined are present. In an example, it is verified whether VOQs having a transmission priority H are present.

In operation 502, the scheduler 100 verifies whether VOQs having a second transmission priority are present in response to the VOQs having the highest transmission priority being absent. In an example, it is verified whether VOQs having a transmission priority L are present.

In operation 503, the scheduler 100 determines the VOQs from which the data is to be transmitted using the inputter arbiters 204 and 205 corresponding to the transmission priority of the VOQs 203. In an example, in response to the VOQs having the transmission priority H, the scheduler 100 determines the VOQs from which the data is to be transmitted among the VOQs having the transmission priority H using the H-inputter arbiters 204. In more detail, the VOQs from which the data is to be transmitted may be determined by performing round robin scheduling starting from pointer values indicated by the H-inputter arbiters 204.

In response to the VOQs having the transmission priority H being absent, the scheduler 100 may determine the VOQs from which the data is to be transmitted among the VOQs having the transmission priority L using the L-inputter arbiters 205. In more detail, the VOQs from which the data is to be transmitted may be determined by performing round robin scheduling starting from pointer values indicated by the L-inputter arbiters 205.

Operations 501 through 503 may be performed in a process of determining input nodes to which a time slot is to be allocated.

In operation 501, the scheduler 100 verifies whether the VOQs having the highest transmission priority among the VOQs 203 of the input nodes 101 making an allocation request for the time slot to the output nodes 102 are present. In an example, it is verified whether VOQs having the transmission priority H are present.

In operation 502, the scheduler 100 verifies whether the VOQs having the second transmission priority are present in response to the VOQs having the highest transmission priority among the VOQs 203 of the input nodes 101 making an allocation request for the time slot to the output nodes 102 being absent. In an example, it is verified whether VOQs having the transmission priority L are present.

In operation 503, the scheduler 100 determines the VOQs from which the data is to be transmitted using the outputter arbiters 206 and 207 corresponding to the transmission priority of the VOQs 203. In an example, in response to the VOQs 203 of the input nodes 101 making the allocation request for the time slot to the output nodes 102 having the transmission priority H, the scheduler 100 may determine the input nodes to which the time slot is to be allocated among the input nodes 101 including the VOQs having the transmission priority H using the H-outputter arbiters 206. In more detail, the input nodes to which the time slot is to be transmitted may be determined by performing round robin scheduling starting from pointer values indicated by the H-outputter arbiters 206.

In response to the input nodes including VOQs having the transmission priority H being absent, the scheduler 100 may determine the input nodes to which the time slot is to be allocated among the input nodes 101 including the VOQs having the transmission priority L using the L-outputter arbiters 207. In more detail, the input nodes to which the time slot is to be transmitted may be determined by performing round robin scheduling starting from pointer values indicated by the L-outputter arbiters 207.

FIG. 6 is a flowchart illustrating a process of updating elements used to allocate a time slot according to an example embodiment.

In operation 600, the scheduler 100 displays the grant indicators 209 indicating allocating of a time slot is completed to output nodes for which the allocating of the time slot is completed.

In operation 601, the scheduler 100 updates and stores pointer values of the outputter arbiters 206 and 207 used to determine input nodes to which the time slot is to be allocated among the input nodes 101.

In operation 602, the scheduler 100 displays the grant indicators 208 to VOQs corresponding to output nodes having the grant indicators 209 among the VOQs of the input nodes to which the time slot is allocated.

In operation 603, the scheduler 100 displays the output node indicators 210 for identifying the output nodes that allocate the time slot to the input nodes to which the time slot is allocated.

In operation 604, the scheduler 100 increases the pointer values of the inputter arbiters 204 and 205 used to determine VOQs from which data is to be transmitted among the VOQs 203.

In operation 605, the scheduler 100 resets all VOQs corresponding to the output nodes having the grant indicators 208 and 209 among the VOQs of the input nodes to which the time slot is not allocated, and allocates a transmission priority E to the VOQs corresponding to the output nodes having the grant indicators 208 and 209.

FIG. 7 illustrates a guaranteed bit rate (GBR) table indicating information on GBR data according to an example embodiment.

The GBR table may include an input node GBR table and an output node GBR table. The input node GBR table may include information for identifying time slots to be allocated for the GBR data and information for identifying virtual output queues (VOQs) in which the GBR data is stored. In an example, the input node GBR table includes identification numbers of the time slots to be allocated for the GBR data and identification numbers of the VOQs in which the GBR data is stored.

In addition, the output node GBR table may include information for identifying the time slots to be allocated for the GBR data and information for identifying input nodes to which the time slots are to be allocated for the GBR data. In an example, the output node GBR table includes identification numbers of the time slots to be allocated for the GBR data and identification numbers of the input nodes to which the time slots are to be allocated for the GBR data.

Figure 8:
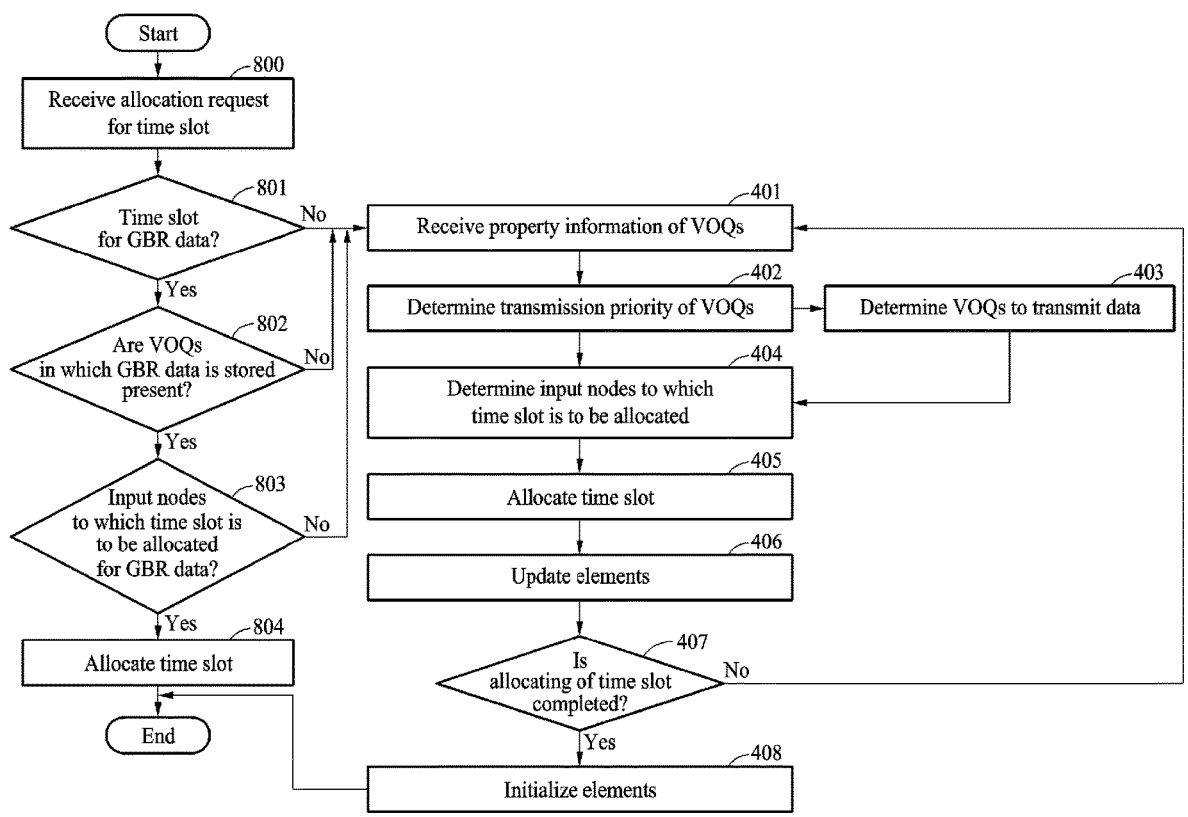
FIG. 8 is a flowchart illustrating a process of allocating a time slot based on guaranteed bit rate (GBR) data according to an example embodiment.

FIG. 8 is a flowchart illustrating a process of allocating a time slot based on guaranteed bit rate (GBR) data according to an example embodiment.

In operation 800, the scheduler 100 receives an allocation request for a time slot from remaining input nodes excluding input nodes with respect to virtual output queues (VOQs) having the grant indicators 208. That is, in operation 800, the scheduler 100 may receive the allocation request for the time slot from the input nodes to which the time slot is not allocated.

Here, the allocation request for the time slot from the input nodes may be associated with all output nodes or predetermined output nodes corresponding to a preset reference.

In operation 801, the scheduler 100 verifies whether a time slot to be currently allocated to input nodes making the allocation request for the time slot is for the GBR data based on an input node GBR table. Here, in response to the time slot to be allocated to the input nodes not being for the GBR data, the scheduler 100 may perform operations 401 through 410.

In operation 802, the scheduler 100 verifies whether VOQs in which the GBR data is stored are present based on the input node GBR table. Here, in response to the VOQs in which the GBR data is stored being absent, the scheduler 100 may allocate the time slot for the GBR data for data other than the GBR data by performing operations 401 through 410.

In operation 803, the scheduler 100 verifies whether the time slot for the GBR data is a time slot to be allocated to the input nodes making the allocation request for the time slot to the current output nodes based on an output node GBR table. Here, in response to the input nodes making the allocation request for the time slot not being the input nodes to which the time slot for the GBR data is not to be allocated, the scheduler 100 may allocate the time slot for the GBR data for data other than the GBR data by performing operations 401 through 408.

In operation 804, the scheduler 100 allocate the time slot to the input nodes when the time slot which is to be currently allocated is the time slot for the GBR data, the VOQs in which the GBR data is stored are present, and the input nodes making the allocation request of the time slot are the input nodes to which the time slot for the GBR data is to be allocated.

Here, the time slot for the GBR data may be priorly allocated irrespective of a transmission priority of the VOQs. The scheduler 100 may update elements used to allocate other time slots after the allocating of the time slot for the GBR data is completed.

According to example embodiments, a scheduling method and a scheduler may assign equal transmission chances to virtual output queues (VOQs) by performing scheduling using grant indicators such that a processing rate of scheduling may be enhanced and a delay time may be reduced.

According to example embodiments, a scheduling method and a scheduler may priorly allocate a time slot irrespective of properties of virtual output queues (VOQs) of input nodes by performing scheduling based on guaranteed bit rate (GBR) data.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling method of a scheduler for switching, the method comprising:
    receiving, at the scheduler, an allocation request for a time slot from input nodes to which the time slot is not allocated from input nodes connected to a switch;
    receiving property information of at least one of virtual output queues (VOQs) in which data received by the input nodes is stored;
    determining a transmission priority of the VOQs for transmission of the data stored in the VOQs based on the received property information of the VOQs;
    determining input nodes to which the time slot is to be allocated using at least two corresponding outputter arbiters, the outputter arbiters being round robin arbiters, each having a different transmission priority level for output nodes corresponding to the VOQs;
    allocating the time slot to the determined input nodes; and
    updating elements used to allocate the time slot with respect to input nodes for which the allocating of the time slot is completed and output nodes for which the allocating of the time slot is completed.

2. The method of claim 1, further comprising: determining VOQs from which the stored data is to be transmitted using at least two corresponding inputter arbiters, the inputter arbiters being round robin arbiters, each having a different transmission priority level corresponding to the determined transmission priority among inputter arbiters for the input nodes to which the time slot is not allocated.

3. The method of claim 2, wherein the determining of the VOQs from which the stored data is to be transmitted comprises:
    identifying whether the determined transmission priority of the VOQs is a highest transmission priority; and
    performing round robin scheduling starting from pointer values indicated by the inputter arbiters corresponding to the determined transmission priority in response to the determined transmission priority being the highest transmission priority.

4. The method of claim 3, wherein the performing of the round robin scheduling comprises performing the round robin scheduling starting from the pointer values indicated by the inputter arbiters corresponding to the determined transmission priority when the VOQs having a transmission priority higher than the determined transmission priority are absent, in response to the determined transmission priority not being the highest transmission priority.

5. The method of claim 1, further comprising: determining output nodes to receive the allocation request for the time slot based on a preset condition.

6. The method of claim 1, wherein the property information includes lengths of the VOQs and delays of the VOQs.

7. The method of claim 1, wherein the determining of the transmission priority comprises:
    determining the transmission priority of the VOQs based on a transmission priority table indicating the transmission priority of the VOQs based on lengths of the VOQs and delays of the VOQs.

8. The method of claim 1, wherein the determining of the input nodes to which the time slot is allocated comprises:
    identifying whether the determined transmission priority of the VOQs of the determined input nodes is a highest transmission priority; and
    performing round robin scheduling starting from pointer values indicated by outputter arbiters corresponding to the determined transmission priority in response to the determined transmission priority being the highest transmission priority.

9. The method of claim 8, wherein the performing of the round robin scheduling comprises performing the round robin scheduling starting from the pointer values indicated by the outputter arbiters corresponding to the determined transmission priority when the input nodes having a transmission priority higher than the determined transmission priority are absent, in response to the determined transmission priority being lower than the highest transmission priority.

10. The method of claim 1, wherein the updating of the elements comprises:
    displaying grant indicators indicating allocating of the time slot is completed to the output nodes for which the allocating of the time slot is completed;
    storing pointer values of the outputter arbiters corresponding to the determined transmission priority of the VOQs;
    displaying the grant indicators to the VOQs corresponding to the output nodes to which the grant indicators are displayed among the VOQs for the input nodes to which the time slot is allocated;
    displaying output node indicators for identifying the output nodes that allocate the time slot to the input nodes to which the time slot is allocated; and
    increasing the pointer values of the inputter arbiters corresponding to the determined transmission priority.

11. The method of claim 10, further comprising: resetting the VOQs corresponding to the output nodes to which the grant indicators are displayed among the VOQs of the input nodes to which the time slot is not allocated.

12. The method of claim 1, further comprising: initializing the elements used to allocate the time slot in response to allocating of the time slot to all input nodes being completed.

13. A scheduling method of a scheduler for switching, the method comprising:
- receiving, at the scheduler, an allocation request for a time slot from input nodes to which the time slot is not allocated from input nodes connected to a switch;
- verifying whether the time slot to be allocated to the input nodes is a time slot for guaranteed bit rate (GBR) data based on a GBR table indicating information on the GBR data and the time slot for the GBR data;
- verifying whether virtual output queues (VOQs) storing the GBR data among at least one VOQ storing data received by the input nodes are present in response to the time slot being for the GBR data;
- priorly allocating the time slot to the input nodes in response to the VOQs storing the GBR data being present; and
- in response to the time slot to be allocated to the input nodes not being for the GBR data, the scheduler allocates the time slot based on a transmission priority of the VOQs.

14. An apparatus for switching including a scheduler, wherein the scheduler is configured to receive an allocation request for a time slot from input nodes to which the time slot is not allocated,
- receive property information of at least one of virtual output queues (VOQs) in which data received by the input nodes to which the time slot is not allocated is stored,
- determine a transmission priority of the VOQs for transmission of the data stored in the VOQs based on the received property information of the VOQs,
- determine input nodes to which the time slot is to be allocated using at least two corresponding outputter arbiters, the outputter arbiters being round robin arbiters, each having a different transmission priority level corresponding to the transmission priority of the determined VOQs among outputter arbiters for output nodes corresponding to the VOQs,
- allocate the time slot to the determined input nodes, and
- update elements used to allocate the time slot with respect to input nodes for which allocating of the time slot is completed and output nodes for which allocating of the time slot is completed.

15. The apparatus of claim 14, wherein the scheduler is configured to determine VOQs from which the stored data is to be transmitted using at least two corresponding inputter arbiters corresponding to the determined transmission priority among inputter arbiters for the input nodes to which the time slot is not allocated.

16. The apparatus of claim 15, wherein the scheduler is configured to determine the VOQs from which the stored data is to be transmitted, identify whether the determined transmission priority of the VOQs is a highest transmission priority, and perform round robin scheduling starting from pointer values indicated by the inputter arbiters corresponding to the determined transmission priority in response to the determined transmission priority being the highest transmission priority.

17. The apparatus of claim 16, wherein the scheduler is configured to perform the round robin scheduling starting from the pointer values indicated by the inputter arbiters corresponding to the determined transmission priority when the VOQs having a transmission priority higher than the determined transmission priority are absent, in response to the determined transmission priority being not the highest transmission priority.

18. The apparatus of claim 14, wherein the scheduler is configured to determine output nodes to receive the allocation request for the time slot based on a preset condition.

19. The apparatus of claim 14, wherein the scheduler is configured to initialize the elements used to allocate the time slot in response to allocating of the time slot to all input nodes being completed.

* * * * *